Dec. 19, 1967   C. JOHNSON   3,358,502
FORCE MEASURING INSTRUMENT
Filed July 19, 1965   7 Sheets-Sheet 1
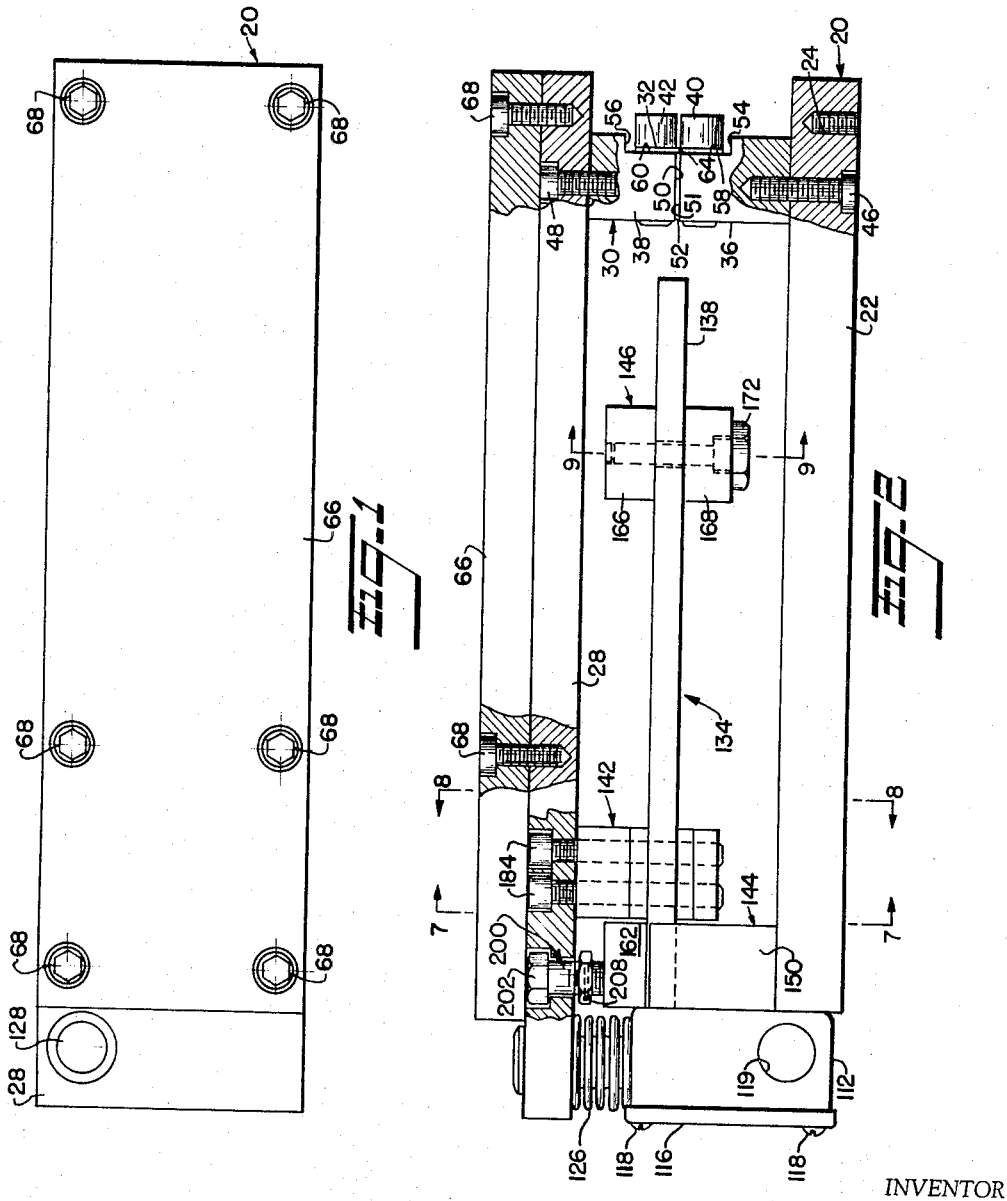
INVENTOR
CLARENCE JOHNSON
BY Strauch, Nolan, Neale,
Nies and Bronaugh
ATTORNEYS Dec. 19, 1967
C. JOHNSON
3,358,502
FORCE MEASURING INSTRUMENT
Filed July 19, 1965
7 Sheets-Sheet 2
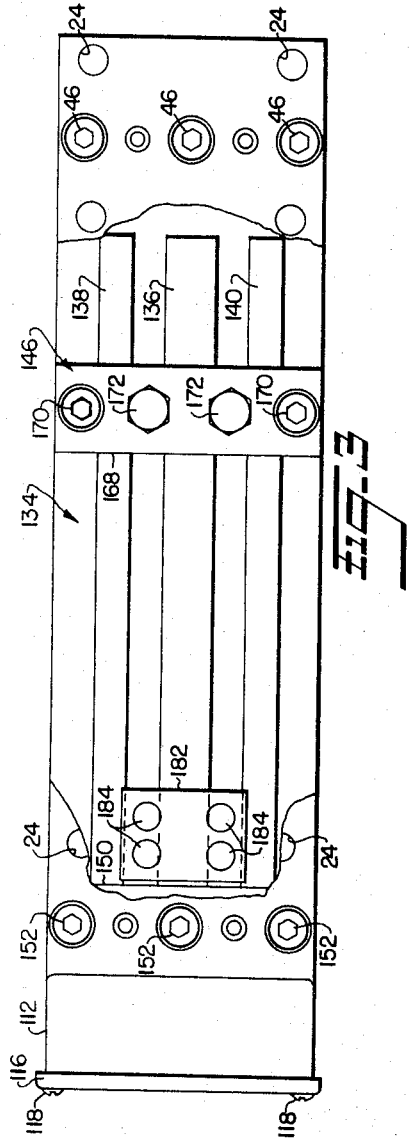
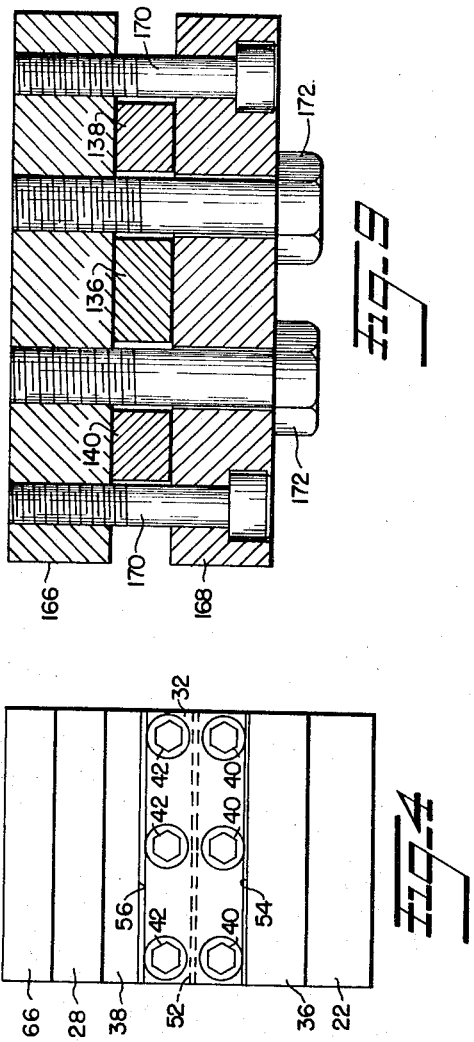
INVENTOR
CLARENCE JOHNSON
BY Strauch, Nolan, Neale,
Nies and Bronaugh
ATTORNEYS

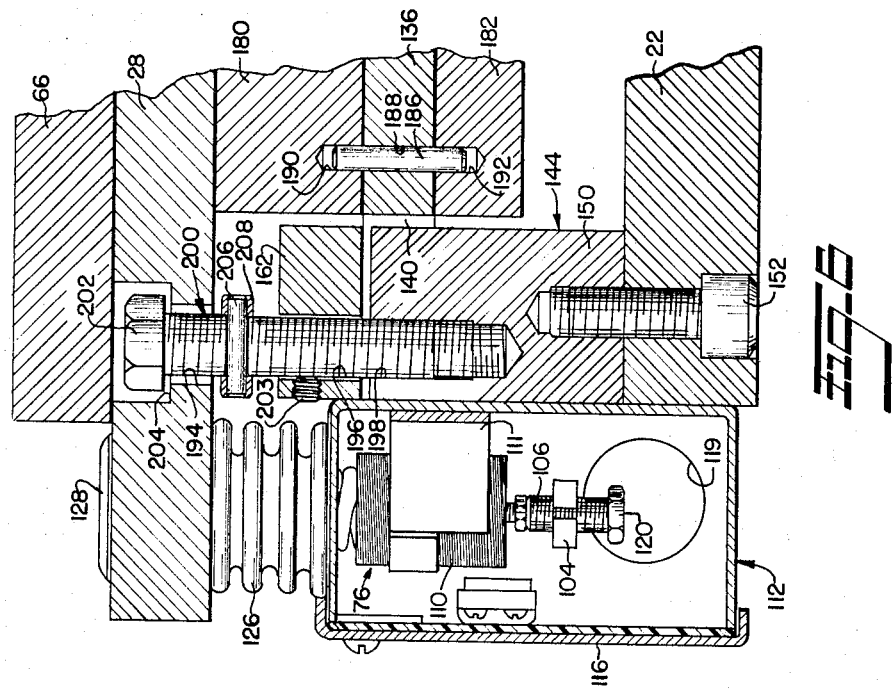
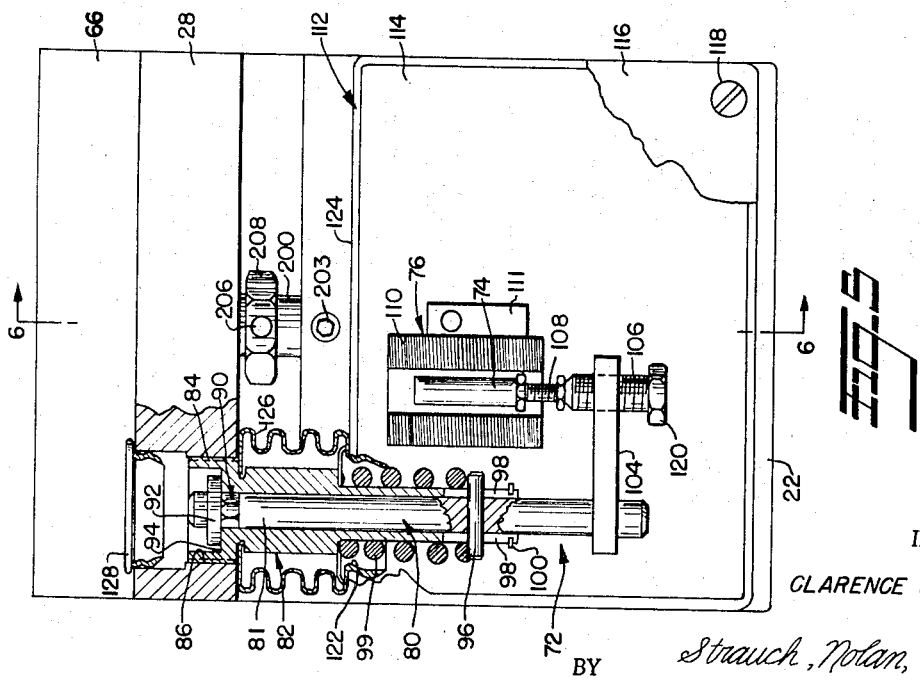

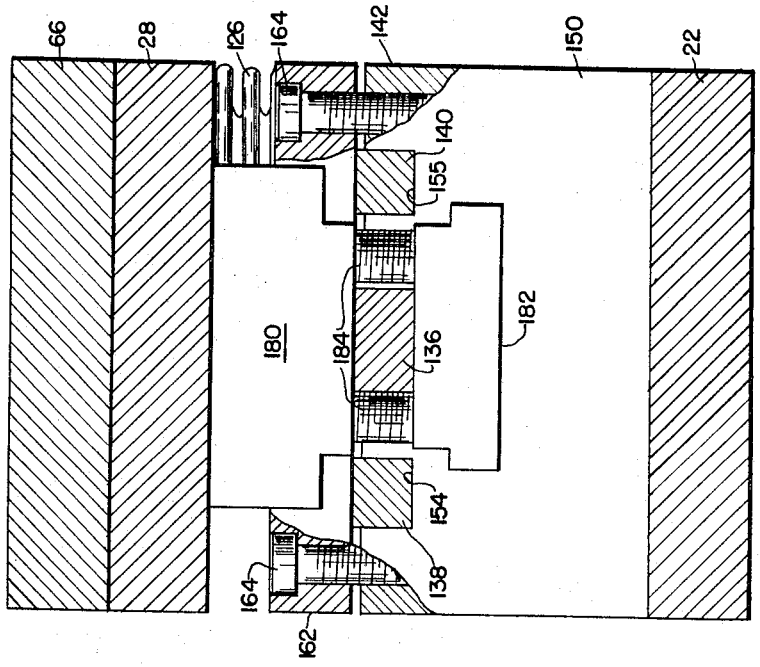
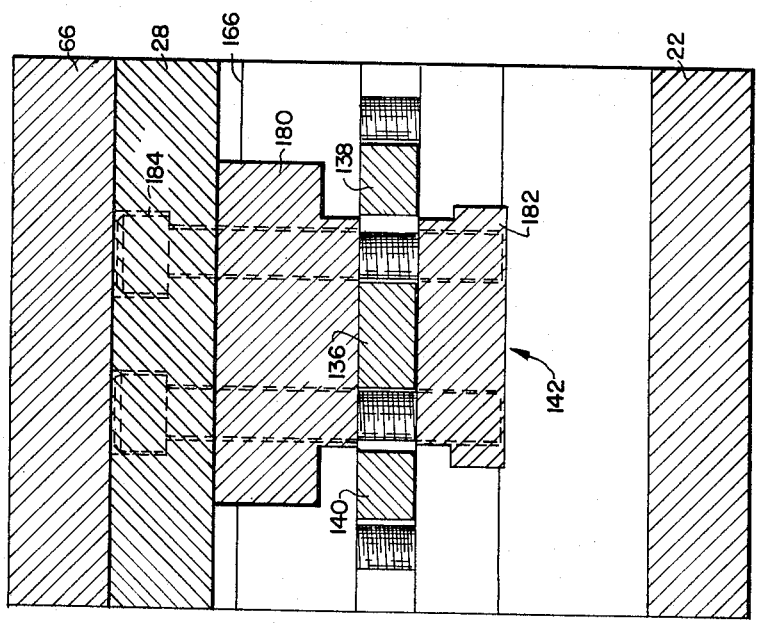

Dec. 19, 1967   C. JOHNSON   3,358,502
FORCE MEASURING INSTRUMENT
Filed July 19, 1965   7 Sheets-Sheet 5
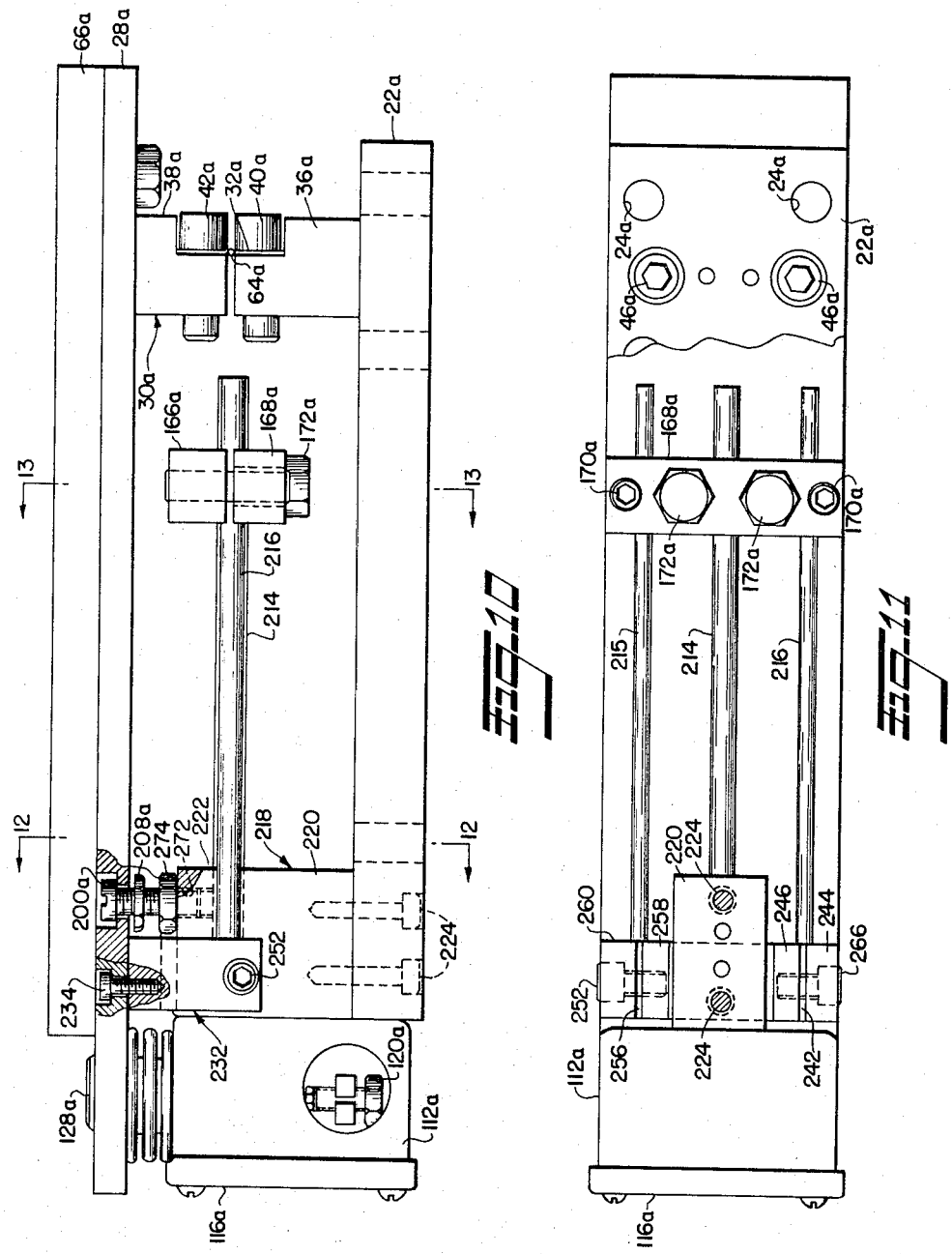
INVENTOR
CLARENCE JOHNSON
BY Strauch, Nolan, Neale,
Nies and Bronaugh
ATTORNEYS

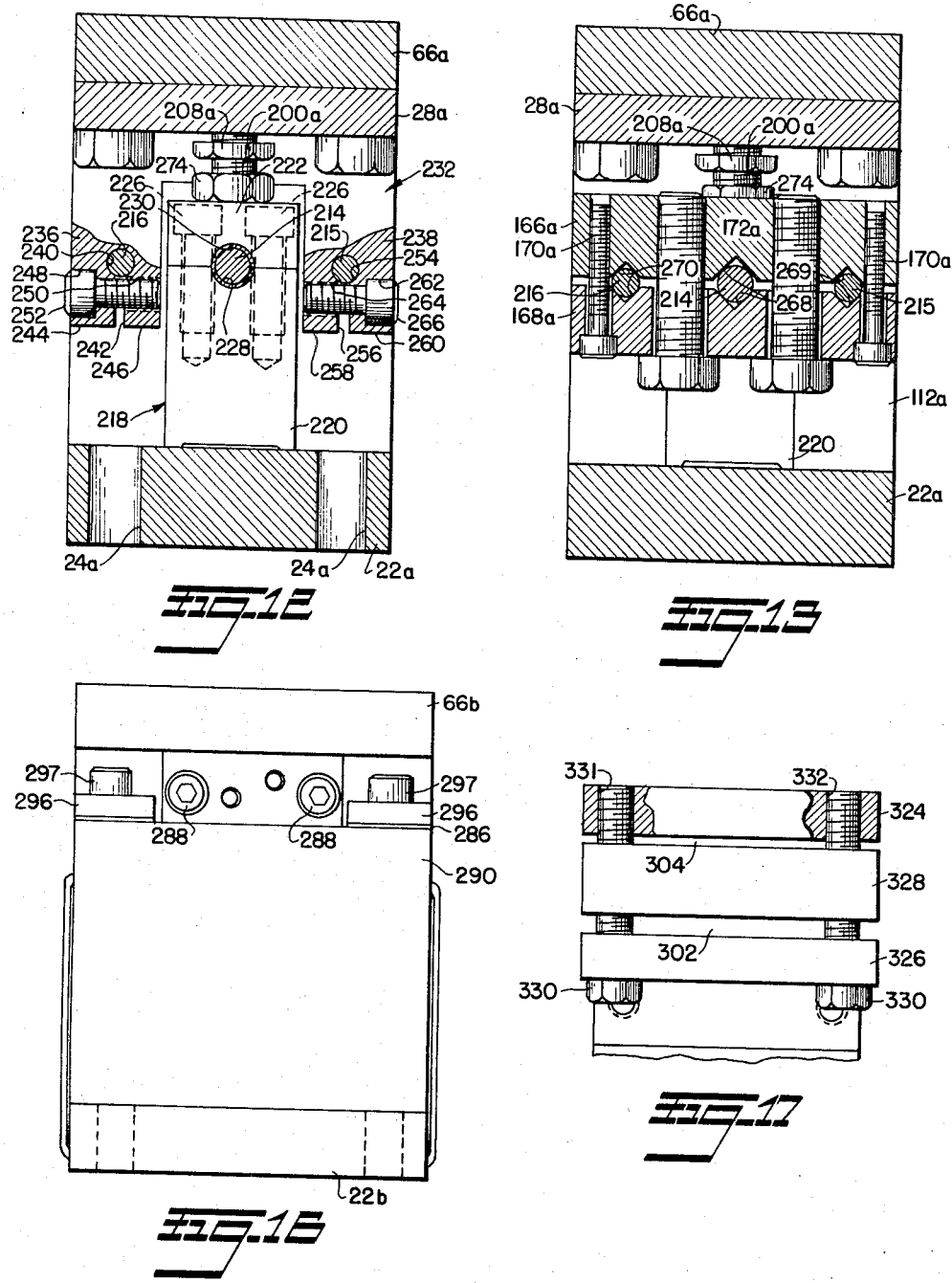

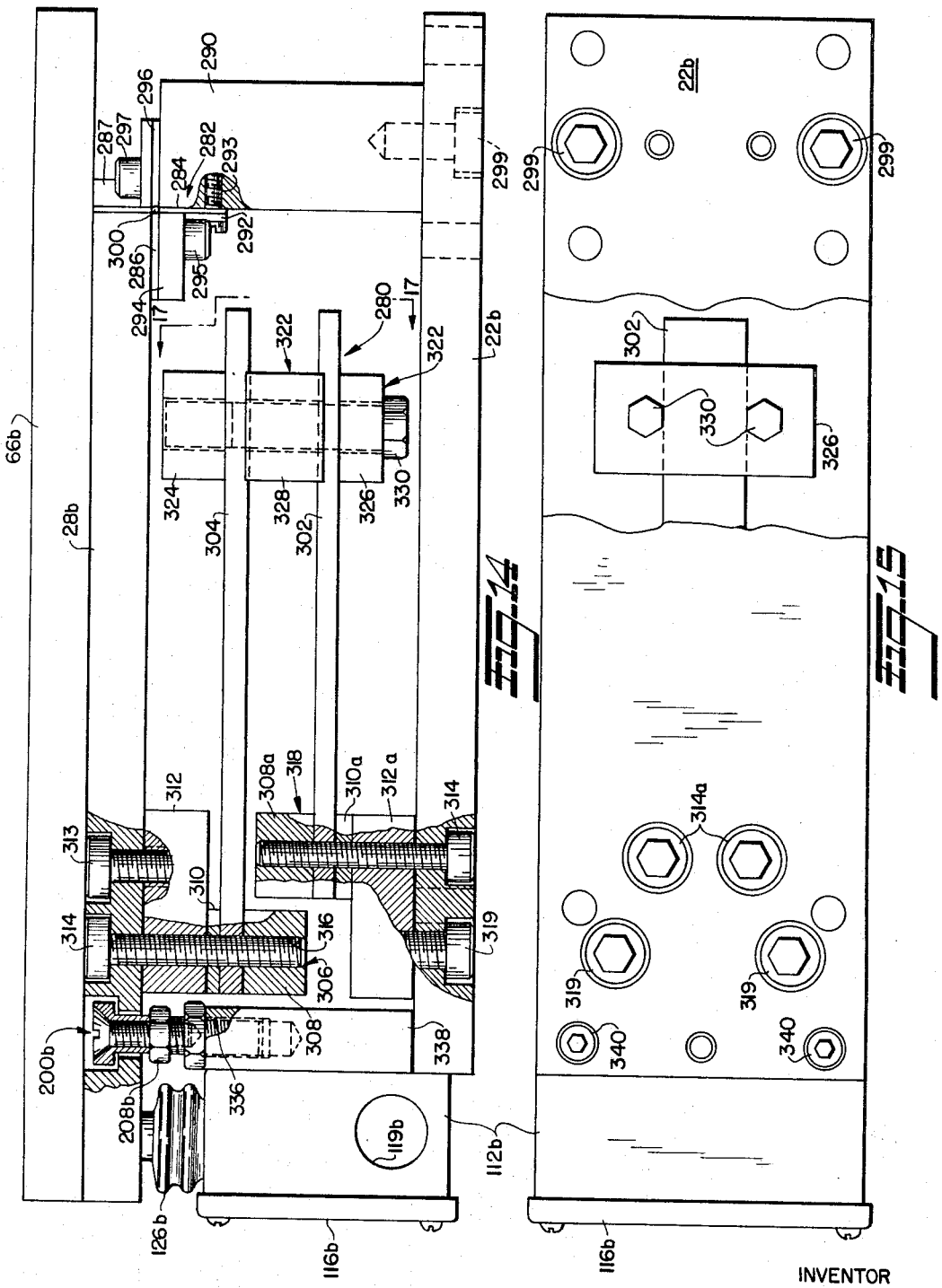

United States Patent Office 3,358,502
Patented Dec. 19, 1967

3,358,502
FORCE MEASURING INSTRUMENT
Clarence Johnson, 31649 Trillium Trail,
Pepper Pike, Cleveland, Ohio 44124
Filed July 19, 1965, Ser. No. 472,978
15 Claims. (Cl. 73—141)

The present invention relates to force measuring devices and especially to transducers which are capable of continuously measuring mechanically applied forces, weight, tension, and other measurable quantities or converting a mechanical force into another form of energy such as an electrical signal.

Typically, force transducers with which the present invention is especially concerned essentially comprise a load supporting platform which is swingably mounted on a fixed base by flexure pivot connection. Forces applied to pivotally deflect the load platform are resiliently opposed by a range adjustment leaf spring operatively connected between the load platform and the base. The force-imparted deflection of the load platform which flexes the leaf spring is transmitted in a selected form of energy to an indicator, control element, or both. This type of force transducer is described in my United States Letters Patent Nos. 2,981,100 and 3,182,495 respectively issued on Apr. 25, 1961, and May 11, 1965, for Force Measuring Instruments.

Although force measuring instruments of the type described above generally operate satisfactorily, they suffer from the disadvantage of having objectionably limited load ranges since the load-resistant, range-adjustment spring may be too stiff or too limber for an anticipated job. As a result, it is often necessary to replace the load-resistant leaf spring in the instrument with one of different thickness and to re-calibrate the instrument to obtain a desired load range. For example, ¼-inch, ⁵⁄₁₆-inch, ⅜-inch, ½-inch, and ⅝-inch thick springs are needed with the force measuring instrument described in the aforesaid Patent No. 2,981,100 to cover a load range extending from 200 pounds to 1500 pounds. The replacement of the load adjustment leaf springs is objectionably time-consuming and is frequently very difficult for inexperienced servicemen to properly do in the field without impairing the accuracy or sensitivity of the instrument.

Accordingly, it is a major object of this invention to provide for a novel, highly accurate, and quickly responsive force measuring instrument which affords an appreciably wider load range than prior instruments without requiring the replacement of any parts.

In conjunction with the foregoing objects, it is a further object of the present invention to provide an adjusting mechanism which permits quick, easy range adjustments to be made without impairing the accuracy, reliability, or sensitivity of the instrument.

Still another object of this invention is to provide a force measuring instrument with a novel load-resistant spring assembly which substantially eliminates the occurrence of resonant frequency.

Resonant frequency in force measuring instruments of the type described above produces objectionable vibrations which impair the accuracy and sensitivity of the instrument. Prior to this invention, vibration dampening devices such as dash pots and coiled springs have been proposed to diminish the vibratory effects resulting from the occurrence of resonant frequency. Dampening devices however, impair the sensitivity of the instrument in addition to making it more complex and expensive to manufacture. The load resistant spring assembly of the instant invention comprises a plurality of force-resistant leaf springs having different resonances which have the effect of breaking up the natural resonant frequency of the spring assembly to thereby prevent its occurrence. As a result, dampening devices for breaking up a natural resonant frequency are not required to be incorporated in a force measuring instrument constructed according to this invention.

Another object of this invention is to provide a novel force measuring instrument of exceptionally compact construction for meeting space requirements in various applications especially pertaining to instrumentation where equipment space is frequently a critical factor.

Still another object of this invention is to provide a force measuring instrument with a novel arrangement which enables independent, selective adjustments to be made respectively for calibrating the instrument and for compensating for measurement errors produced by ambient temperature induced expansion and contraction of the operative instrument parts which transmit forces to be measured to an output element.

A further object of this invention is to provide a force measuring instrument of the type previously described with a novel jacking assembly which is selectively operable to relieve the load applied by the force receiving platform to a range-adjustment, load-resistant spring assembly for enabling adjustments in the load range of said spring assembly to be made at no-load conditions.

Further objects will appear as the description proceeds in connection with the appended claims and the annexed drawings wherein:

FIGURE 1 is a top plan view of a preferred form of the force measuring instrument constructed in accordance with the principles of this invention;

FIGURE 2 is a partially sectioned side elevation of the force measuring instrument shown in FIGURE 1;

FIGURE 3 is a bottom plan view of the force measuring instrument shown in FIGURE 1 with parts broken away and sectioned to show the construction more clearly;

FIGURE 4 is a right-hand end elevation of the force measuring instrument as viewed from FIGURE 1;

FIGURE 5 is an enlarged left-hand end elevation of the force measuring instrument as viewed from FIGURE 1 with parts broken away and sectioned to show the construction more clearly;

FIGURE 6 is a section taken substantially along lines 6—6 of FIGURE 5;

FIGURE 7 is an enlarged section taken substantially along lines 7—7 of FIGURE 2;

FIGURE 8 is an enlarged section taken substantially along lines 8—8 of FIGURE 2;

FIGURE 9 is an enlarged section taken substantially along lines 9—9 of FIGURE 2;

FIGURE 10 is a partially sectioned side elevation of another form of force measuring instrument constructed in accordance with this invention;

FIGURE 11 is a bottom plan view of the force measuring instrument shown in FIGURE 10 with parts broken away to illustrate the construction more clearly;

FIGURE 12 is a section taken substantially along lines 12—12 of FIGURE 10;

FIGURE 13 is a section taken substantially along lines 13—13 of FIGURE 10;

FIGURE 14 is a partially sectioned side elevation of still another form of force measuring instrument constructed in accordance with the principles of this invention;

FIGURE 15 is a bottom plan view of the instrument shown in FIGURE 14 with parts broken away to illustrate the construction more clearly;

FIGURE 16 is a right-hand elevation of the force measuring instrument as viewed from FIGURE 14; and FIGURE 17 is a section taken substantially along lines 17—17 of FIGURE 14.

Referring now to the drawings and more particularly to FIGURES 1–3, the reference numeral 20 designates a force measuring instrument constructed in accordance with the principles of the present invention and comprising a rigid, rectangular base 22 which constitutes a support frame for the operating components of the instrument. Base 22, which preferably is of adequate thickness to provide a rigid fixed support, is provided with parallel, laterally spaced apart through bores 24 (see FIGURE 3) which are adapted to receive unshown mounting bolts for securing the instrument in a fixed, operative position. Base 22 may be mounted in any position since the functioning parts of the instrument are so constructed and arranged as to operate irrespective of the position in which base 22 is supported. Thus, base 22 may be mounted at any angle, either completely up-side-down or at any oblique angle by utilizing proper securing means.

As best shown in FIGURES 2 and 4, a force-receiving platform 28 comprising a relatively thick, flat-sided, rectangularly shaped plate is supported on base 22 by a flexure pivot assembly 30. In the position of parts shown in the drawings, platform 28 is disposed vertically above base 22 and has a bottom surface facing the top surface of base 22. Pivot assembly 30 comprises a flat-sided, upstanding flexure plate 32 which is secured adjacent its opposite ends to support blocks 36 and 38 by separate sets of machine screws 40 and 42 respectively. Support block 36 is secured by set screws 46 to base 22 adjacent the right-hand or rearward edge thereof as viewed from FIGURE 2. Support block 38 is disposed vertically above block 36 and secured by screws 48 (one shown) to platform 28 adjacent the right-hand edge thereof. As shown, support block 38 is formed with a planar surface 50 facing a planar surface 51 on block 36. Surfaces 50 and 51 delimit a clearance space 52 extending horizontally between blocks 36 and 38 substantially midway between platform 28 and base 22.

Support blocks 36 and 38, as best shown in FIGURE 2, are provided with machined notches 54 and 56 forming a rearwardly opening channel and respectively having flat, rearwardly facing wall surfaces 58 and 60 formed at right angles to their associated surfaces 50 and 51. Flexure plate 32 is firmly seated against surfaces 58 and 60 by set screws 40 and 42 and extends substantially the entire width of the channel formed by notches 54 and 56.

With the construction thus far described, flexure plate 32 provides a hinge or flexure pivot connection between platform 28 and base 22, the axis of the hinge being located approximately at 64 (see FIGURE 2) and extending laterally of platform 28 adjacent to clearance space 52. In the position of parts shown in FIGURE 2, plate 32 is unflexed, and platform 28 and base 22 are disposed in substantially parallel relationship, with surfaces 50 and 51 being contained in spaced apart, substantially parallel planes. By applying a load to platform 28, plate 32 is flexed to allow platform 28 to pivot in a counterclockwise direction about axis 64.

The dimensions and material requirements of flexure plate 32 are selected in accordance with the range of forces to be measured to provide, as an example, an angular deflection range of about 10 minutes and to assure that the maximum and minimum deflecting forces to be encountered in use will fall within the elastic limits of the material. Owing to the substantial lateral dimension of flexure plate 32 and its firm clamping connection to support blocks 36 and 38, platform 28 is constrained against lateral movement, but is free for pivotable displacement about axis 64 to the extent permitted by the elastic limits of the material of which plate 32 is made.

As shown in FIGURES 1 and 2, a flat-sided adaptor plate 66 is secured by set screws 68 to platform 28. Adaptor plate 66 may support a pillow block journalling a roller, for example, which could support a run of a conveyor belt, the tension of which is to be measured. It will be appreciated that any other means of transmitting a force to platform 28 may be employed depending upon the use desired to be made of the force measuring instrument of this invention. For example, strain gauges, air gauges, and other devices may be connected to platform 28 for data transmission purposes.

As shown in FIGURES 2, 5, and 6, platform 28 extends forwardly from the pivot connection provided by assembly 30 to a region disposed beyond the forward end of base 22. In this embodiment, the forward, deflectible end of platform 28 is connected by a motion transmitting assembly 72 to a suitable controller comprising an armature core 74 of a differential transformer 76 which is operative to convert the pivotal displacement to platform 28 into an electrical signal that may be transmitted to a suitable controller, indicator, or recorder.

As best shown in FIGURE 5, a null adjustment device 80 forming a part of motion transmitting assembly 72 for calibrating the instrument comprises a cylindrical rod 81 which coaxially and slidably extends through a rigid sleeve 82. Sleeve 82 depends from platform 28 and is formed with an upper diametrically enlarged end section 84 threadedly received in a tapped vertical through bore 86 formed in the forward portion of platform 28 overhanging base 22. A fine threaded, adjustment cap screw 90 is coaxially threaded into the upper end of rod 81. The head 92 of screw 90 is adapted to seat on an annular, upwardly facing shoulder 94 formed in sleeve 82 to limit downward displacement of rod 81.

With continued reference to FIGURE 5, a cylindrical pin 96 coaxially extends with a snug fit through a bore formed in rod 81 at right angles to the longitudinal axis thereof. The opposite ends of pin 96 protrude beyond the periphery of rod 81 and extend with a sliding fit through diametrically opposed, longitudinal, downwardly opening slots 98 formed in the lower end of sleeve 82. A helically coiled spring 99 surrounding sleeve 82 is compressed between pin 96 and an external, downwardly facing, annular shoulder formed on sleeve 82 to bias rod 81 downwardly and thereby seat the head of screw 90 on shoulder 94. A groove-seated retainer ring 100 carried on the lower end of sleeve 82 is abuttable with the protruding ends of pin 96 to limit relative displacement between rod 81 and sleeve 82.

Still referring to FIGURE 5, the lower end of rod 81 extends beyond sleeve 82 and carries a crossbar 104 which extends laterally with respect to platform 28 and which threadedly mounts a verical internally and externally threaded sleeve 106. An adjustable rod 108 coaxially threaded into sleeve 106 interconnects core 74 and sleeve 106 along a common axis extending parallel to the longitudinal axes of rod 81 and sleeve 82.

Core 74 is coaxially received in a hollow transformer winding 110 which is fixed by a suitable bracket 111 to the back wall of a conduit box 112 having a forwardly facing opening 114. A gasketed cover plate 116 detachably secured to casing 112 by screws 118 covers opening 114. Conduit box 112 is fixed to the forward end of base 22 by any suitable means. The side walls of box 112 are provided with apertures 119 (see FIGURES 2 and 6) for receiving suitable electrical conductor fittings (not shown) through which unshown leads adapted to be connected to the terminals of winding 110 may extend.

From the above description of motion transmitting assembly 72 it will be appreciated that deflection of platform 28 about the pivot connection axis 64 imparts a proportional axial displacement to core 74 for varying the magnitude of the electrical output signal at the terminals of winding 110. Zero or null adjustment is effected by threading screw 90 into or out of rod 81 to axially displace rod 81 and, consequently, core 74 to a zero set position relative to sleeve 82 and platform 28. Adjustment of screw 90 thus varies the position of core 74 relative to the top of platform 28 and adaptor plate 66. Rod 81 is prevented from turning with screw 90 by engagement of pin 96 with the edges of slots 98. In this embodiment, one revolution of screw 90 axially shifts rod 81 by approximately 0.025 inch. Spring 99 in biasing rod 81 downwardly is effective to take up any lost motion in motion transmitting assembly 72, thereby assuring a proportional displacement of core 74 when platform 28 is pivotally deflected about the pivot axis 64.

In installations where ambient temperature is not controlled, a temperature change will cause small, but measurable changes in the output signal at the terminals transformer winding 110 since the differences in expansion and contraction of metals especially of the several components forming motion transmitting assembly 72 will, if uncompensated for, objectionably displace armature 74 relative to platform 28 without a change in the platform-applied load being measured. It is desirable, therefore, to compensate for such temperature changes as small movements in the force measuring device of this invention are critical, effecting objectionable variances in the controlling or indicating characteristics.

Effective temperature compensation is obtainable by adjusting the axial position of core 74 relative to sleeve 106, crossbar 104, rod 81, sleeve 82, and, consequently platform 28. This is accomplished by rigidly forming sleeve 106 with a hex head 120 so that it may easily be turned with a wrench or other tool. By turning sleeve 106, core 74 is axially displaced relative to winding 110 and the other components of motion transmitting assembly 72 to effect a temperature compensating adjustment independently of the calibration adjustment afforded by manipulation of screw 90.

In addition to the foregoing adjustment of core 74, temperature induced changes in the position of core 74 may be minimized by making rod 81 preferably of Invar or other metal having a similar low or negligible coefficient of thermal expansion, making rod 108 which carries armature 74 preferably of magnesium or a metal having a similarly high thermal coefficient of expansion, making sleeve 106 forming the connection between crossbar 104 and rod 108 of brass or other metal having a coefficient of thermal expansion lower than that of rod 108. Therefore, by varying the proportion of brass and magnesium in the connection between crossbar 104 and armature 74, the amount of extension of armature 74 into the winding of the transformer can be controlled to compensate for temperature changes after the instrument is once set up and adjusted. Further explanation of this temperature compensation feature is disclosed in the aforesaid Patent No. 3,184,495, reference being made thereto in the event further description is desired.

If the force transducer structure of this invention is used in tension, rod 81 then preferably is formed from aluminum in order to more accurately compensate for temperature variations.

As shown in FIGURE 5, sleeve 82 extends through an aperture 122 formed in a top wall portion 124 of conduit box 112. To prevent entry of contaminating atmospheric dust, other foreign particles, and moisture into conduit box 112, a corrugated, flexible bellows 126 of negligible resistance is clamped in sealing relation around aperture 122 and around sleeve 82 at the lower end of bore 86. A snap-on cap 128 is seated in the upper end of bore 86 in sealing relation therewith to thereby provide an enclosed, substantially air-tight chamber composed of bore 86, the interior of bellows 126, and the interior of conduit box 112. To obtain access to screw 90, cap 128 is easily pried off by a tool such as a screwdriver.

As shown in FIGURES 2 and 3, a range adjustment cantilever spring assembly 134 reacts against base 22 to resiliently resist pivotal displacement of platform 28 by forces applied thereto. Spring assembly 134, in accordance with this invention, comprises a center flat-sided leaf spring 136 extending along the longitudinal axis of the instrument between and in parallel spaced apart relation to a pair of flat-sided side leaf springs 138 and 140. Spring 136 is fixedly secured in cantilever fashion at its left-hand end to platform 28 by a clamp and support block assembly 142. Springs 138 and 140 are fixedly secured in cantilever fashion at their corresponding, left-hand ends to base 22 by a further clamp and support block assembly 144. The corresponding, right-hand free ends of springs 136, 138, and 140, as viewed from FIGURES 2 and 3, are rigidly clamped together by an adjustable clamping assembly 146 to thus connect spring 136 in series relationship with the sub-assembly of springs 138 and 140. As a result, flexing forces applied to platform 28 are transmitted first through spring 136 and then in parallel relation through springs 138 and 140.

The longitudinal flexure axes of springs 136, 138, and 140 are contained in parallel spaced apart planes normally intersecting pivot axis 64. In their unflexed positions shown in the drawings, the longitudinal flexure axes of springs 136, 138, and 140 are contained in a common plane extending about midway between the opposed bottom and top faces of platform 28 and base 22 and containing the pivot connection axis 64 for a purpose to be explained in detail later on.

In this embodiment the cross sections of springs 136, 138, and 140 are rectangular. Springs 138 and 140 are of the same construction, and have the same dimensions. Spring 136 is somewhat shorter than springs 138 and 140 and has greater lateral width than springs 138 and 140. By varying the dimensions of spring 136 with respect to springs 138 and 140 in this manner, the resonant frequency of spring assembly 134 is effectively broken up to prevent the occurrence of objectionable vibrations. As a result, the accuracy and sensitivity of the force measuring instrument of the present invention is improved in comparison with conventional instrumens employing a single spring a plurality of identically constructed springs connected in parallel relationship.

In the unflexed positions, springs 136, 138, and 140 are straight and parallel from end to end.

Referring in detail to FIGURES 6 and 8, assembly 144 comprises a spring support block 150 which is fixed by set screws 152 to base 22 adjacent to the back wall of casing 112 and which is formed with a pair of parallel laterally spaced apart, upwardly opening, longitudinally extending machined notches 154 and 155 each defined by a planar bottom wall extending perpendicularly between parallel, straight side walls. Notches 154 and 155 are disdisposed equidistantly on opposite sides of the longitudinal axis of the instrument. The corresponding left-hand ends of springs 138 and 140 are interfittingly and slidably received in notches 154 and 155 respectively and are seated on the notch bottom walls. Springs 138 and 140 are securely anchored to support block 150 by a clamp plate 162 and laterally spaced apart securing screws 164.

As shown in FIGURES 2, 3, and 9 assembly 146 for securing together the free ends of springs 136, 138, and 140 comprises a pair of flat-sided, opposed, laterally extending clamping plates 166 and 168 and a laterally spaced pair of set screws 170 and machine screws 172 which extend upwardly through parallel, smooth walled bores in plate 168 and which thread into aligned tapped bores formed in plate 166. Springs 136, 138, and 140 are securely clamped between plates 166 and 168 by tightening screws 170 and 172.

Set screws 170, as best shown in FIGURE 9, are disposed laterally outwardly of springs 138 and 140 and secure together corresponding ends of plates 166 and 168. Machine screws 172 respectively extend between springs 136 and 140 and between springs 136 and 138 to define with screws 170 and plates 166 and 168 open ended channels through which springs 136, 138 and 140 extend.

As best shown in FIGURES 2, 7, and 8, clamp and support block assembly 142 for anchoring the left-hand end of spring 136 (as viewed from FIGURE 2) comprises a spacer block 180 and a clamping block 182. Clamping block 182 is secured to platform 28 by laterally spaced set screws 184 which extend downwardly through parallel bores formed in spacer block 180. The left-hand end of spring 136, as best shown in FIGURES 6 and 8, is clamped tightly between opposed, planar top and bottom faces of clamping block 182 and spacer block 180 by tightening screws 184.

To properly orient spring 136 relative to springs 138 and 140, a cylindrical pin 186, as shown in FIGURE 6, coaxially extends through a vertical bore 188 formed in spring 136 along an axis perpendicularly intersecting the longitudinal flexure axis of the spring. The opposite ends of pin 186 are coaxially received in axially aligned blind locating bores 190 and 192 respectively formed in spacer block 180 and clamping block 182.

As best shown in FIGURE 6, platform 28 is formed with a stepped through bore 194. When platform 28 is parallel with base 22, bore 194 axially aligns with a smooth walled through bore 196 formed in clamping plate 162 and with an upwardly opening, blind, tapped bore 198 formed in support block 150 below clamping plate 162. A limit adjusting screw 200 having an enlarged head 202 is inserted downwardly and freely, through bores 194 and 196 and is threaded into bore 198. Adjusting screw 200 is fixed to clamping plate 162 by a set screw 203. Bore 194 is counterbored to provide an upwardly facing annular shoulder 204 on which head 202 is adapted to seat to limit upward deflection of platform 28.

A fixed pin 206 extends through a transverse bore in the shank portion of screw 200 and has radially protruding ends which extends through aligned bores in a hex washer 208 to fix washer 208 on the shank screw 200. Washer 208 is adapted to butt against the underside of platform 28 for limiting downward deflection of the platform. The axial distance between head 202 and washer 208 determines the maximum deflection of platform 28. By loosening set screw 203, adjusting screw 200 may be threaded into or out of bore 198 to unitarily shift the upper and lower stops respectively provided by head 202 and washer 208. The clearance between the shank of adjusting screw 200 and bore 194 is sufficiently large to prevent binding as platform 28 is deflected between its upper and lower limits.

To adjust the load range of the force measuring instrument just described, set screw 203 preferably is first loosened and adjusting screw 200 is threaded up to butt washer 208 against the underside of platform 28 to take up the load of spring assembly 134 with screw 200. The assembly of screw 200 and washer 208 thus acts in the manner of a jack in addition to providing limiting stops for platform 28.

After taking up the spring load with screw 200, the screws 170 and 172 are loosened, clamping plates 166 and 168 are shifted to a selected position along springs 136, 138, and 140, and screws 170 and 172 are then retightened to rigidly clamp the free ends of springs 136, 138, and 140 together. Shifting clamping plates 166 and 168 toward the fixed ends of springs 136, 138, and 140 effectively shortens and thus stiffens the resistance of springs 136, 138, and 140. Shifting clamping plates 166 and 168 in the opposite direction effectively lengthens and thus lessens the resistance of springs 136, 138, and 140. It is apparent the effective lengths of springs 136, 138, and 140 may be infinitely varied by selectively shifting clamping plates 166 and 168 for providing a quick and easy adjustment of the load range of the instrument.

By rigidly clamping springs 136, 138, and 140 together at regions longitudinally spaced from their fixed cantilever support points, the free ends of springs 136, 138, and 140 are securely maintained parallel with each other and essentially parallel with the fixed ends of the springs as platform 28 is deflected by forces applied thereto. Thus, when platform 28 is deflected, springs 136, 138, and 140 each bend adjacent to their fixed cantilever support ends and also adjacent to clamping assembly 146. Platform-deflecting forces, accordingly, are transmitted serially through four bending regions in spring assembly 134 as compared with only one bending region provided by a single spring as shown in the aforesaid Patent Nos. 2,981,100 and 3,182,495 or by multiple springs clamped in parallel relationship. This has the effect of increasing the efficiency of spring assembly 134 four-fold while reducing the maximum stress in springs 136, 138, and 140 by one-half for equivalent loads in comparison with springs having only one bending region.

The series connection of spring 136 with the sub-assembly of springs 138 and 140 thus provides for an effective spring length which is the equivalent of the sum of the lengths of spring 136 and the sub-assembly of springs 138 and 140, while the parallel, side-by-side arrangement of springs 136, 138 and 140 minimizes the overall height and length of the instrument needed to accommodate assembly 134.

Spring assembly 134 constructed according to the principles of this invention provides an adjustment range on the order of 20 to 1 in comparison with the relatively small adjustment range of about 2 to 1 obtained with a single spring. By making spring 136 about $3/16$-inch thick and springs 138 and 140 about $3/8$-inch thick, for example, the adjustable load range obtainable with the instrument of this invention infinitely extends from about 100 pounds to 2000 pounds without requiring the replacement of springs of different thickness. In contrast, a force measuring instrument employing a single force resistant spring as described in the aforesaid Patent No. 2,981,100 requires the replacement of five springs of different thicknesses to obtain a load range of only 200 pounds to 1500 pounds.

With conventional force measuring instruments of the type described in the aforesaid Patent Nos. 2,981,100 and 3,182,495, it was the practice to wait until data pertaining to the load range was made available by the intended user to determine the proper thickness of the range adjustment spring before completing the assembly of the instrument. With the present invention, however, the force measuring instrument described herein may be assembled and stored prior to calibration conforming to the user's load range data owing to the appreciably wider load range that is afforded without requiring replacement of springs of different thicknesses. In addition, the exceptionally wide load range afforded by the spring assembly of this invention all but eliminates the need to replace springs 136, 138, and 140 with thicker or thinner ones to meet changes in load range conditions in the field.

By placing the force receiving platform pivot axis 64 in a plane passing through the unflexed longitudinal axes of springs 136, 138, and 140, objectionable end motion of spring 136 is reduced from several thousandths of an inch to several millionths of an inch which is readily taken up by stretching and compression of the springs.

By operatively disposing the null adjustment device 80 in motion transmitting assembly 72, it is not subject to loading by forces applied to deflect platform 28. As a result, adjustment of screw 90 is easily managed to vary the relative positions of platform 28 and core 74.

In the embodiment illustrated in FIGURES 10-13, springs 136, 138, and 140, are respectively replaced with springs 214, 215, and 216 which are round in cross-section. To the extent that the force measuring instrument shown in FIGURES 10-13 is the same as the instrument illustrated in FIGURES 1-10, like reference numerals suffixed by the letter *a* have been used to identify like parts.

As best shown in FIGURES 11 and 12, spring 214 is fixedly secured at its left-hand end to base 22a by a clamp and support block assembly 218. Assembly 218 comprises a support block 220 and a clamping plate 222. Support block 220 is fixed by screws 224 to base 22a adjacent to the back wall of box 112a and extends between base 22a and platform 28a. Clamping plate 222 is removably fixed on top of support block 220 by screws 226. Support block 20 and clamping plate 22 are formed with opposed, matching, semi-circular grooves 228 and 230 defining a bore receiving the left-hand end of spring 214 and having a slightly smaller diameter than that of spring 214. The left-hand end of spring 214 is securely clamped in place between the clamping surfaces of grooves 228 and 230 by tightening screws 226.

As best shown in FIGURE 12, springs 215 and 216 are fixedly secured in cantilever fashion to platform 22a by a support block 232. Support block 232 is rigidly fixed to platform 28a by screws 234 and is formed with depending arms 236 and 238 which extend downwardly on opposite sides of support block 220. Arm 236 is formed with a through bore 240 having a longitudinal axis disposed in parallel spaced apart relation to the axis of the bore defined by grooves 228 and 230. A vertical slot 242 formed in arm 236 normally intersects bore 240 and defines a pair of side-by-side yieldable, depending leg portions 244 and 246. The left-hand end of spring 216 extends through bore 240 with a snug fit. Leg portion 244 is formed with a stepped through bore 248 which axially aligns with a tapped through bore 250 formed in leg portion 246 along an axis extending at right angles to the and laterally off-set from the longitudinal axis of bore 240. A clamping screw 252 inserted through bore 248 is threaded into bore 250 to draw leg portions 244 and 246 together to securely clamp the left-hand end of spring 216 in cantilever fashion to support block 232.

With continuing reference to FIGURE 12, arm 238, which is of the same construction as arm 236, is formed with a through bore 254 normally intersected by a vertical slot 256. Slot 256 forms a pair of depending, side-by-side, yieldable leg portions 258 and 260. The left-hand end of spring 215 is snugly, coaxially received in bore 254. The axes of bores 240 and 254 are parallel and spaced equidistantly on opposite sides of the bore defined by grooves 228 and 230. The axes of bores 240 and 254 and the bore formed by grooves 228 and 230 are contained in a common plane which is parallel to base 22a and which passes through the pivot axis 64a about which platform 28a is pivotally deflectable.

Still referring to FIGURE 12, leg portion 260 is formed with a smooth walled, stepped bore 262 which axially aligns with a tapped bore 264 formed in leg portion 258. The aligning axes of bores 262 and 264 align with the axes of bores 248 and 250 and extend at right angles to bore 254 below spring 215. A clamping screw 266 extending through bore 262 is threaded into bore 264 to draw leg portions 258 and 260 toward each other to securely clamp the left-hand end of spring 215 in cantilever fashion in bore 254.

As best shown in FIGURES 11 and 13, the clamping plate assembly for fixing together the free ends of springs 214–216 in mutually parallel relation is the same as assembly 146 illustrated in FIGURES 1–9 except that clamping plates 166a and 168a are respectively formed with three sets of matching pairs of V-shaped notches 268, 269 and 270 defining channels respectively receiving springs 214, 215, and 216.

The longitudinal flexure axes of springs 214–216 are contained in parallel spaced apart planes normally intersecting pivot axis 64a. In their unflexed position shown in the drawings, the longitudinal flexure axes of springs 214–216 are contained in a common plane extending about midway between the opposed bottom and top faces of platform 28a and base 22a and containing the pivot axis 64a in the same manner as described in the embodiment of FIGURES 1–9.

Springs 215 and 216 are of the same construction and have the same dimensions. Spring 214 is formed with a larger diameter than that of springs 215 and 216 and may be longer or shorter than springs 215 and 216 to break up the resonant frequency of the spring assembly for preventing the occurrence of objectionable vibrations in the manner described in the previous embodiment.

In the same manner as described in the embodiment of FIGURES 1–9 springs 214–216 each bend adjacent to their fixed cantilever support ends and also adjacent to the clamping assembly 146a. Platform deflecting forces transmitted serially through spring 214 and the sub-assembly of springs 215 and 216, thus pass through four bending regions in the spring assembly.

In the embodiment of FIGURES 10–13, adjusting screw 200a, as best shown in FIGURE 10, is coaxially threaded into and upwardly opening blind tapped bore 272 formed in support block 220. A locking nut 274 secures adjusting screw 200a in its adjusted position.

FIGURES 14–17 illustrate a further embodiment of this invention containing a modified range adjustment force resisting spring assembly 280 which is advantageously employed where it is desired to minimize the width rather than the height of the force measuring instrument. To the extent that the embodiment shown in FIGURES 14–17 is the same as the previous embodiments, like reference numerals suffixed by the letter b have been used to designate like parts.

As best shown in FIGURES 14 and 16, platform 28b is pivotally mounted on base 22b by a flexure pivot assembly 282 consisting essentially of a pair of mutually perpendicular flexure plates 284 and 286. Plate 284 lies in a vertical plane and is secured to platform 28b by a backing plate 287 and set screws 288.

As best shown in FIGURE 14, plate 284 extends downwardly from the right-hand end of platform 28b and is secured to a support block 290 by a backing plate 292 and screws 293. Flexure plate 286 is of U-shaped configuration in plan and is secured through its main body portion to platform 28b by a backing plate 294 and set screws 295. The free ends of the leg portions of flexure plate 286 extend rearwardly on opposite sides of plate 284 and each is secured to support block 290 by a backing plate 296 and set screws 297. Support block 290 is rigidly fixed to base 22b by set screws 299 as shown in FIGURES 14 and 15.

Flexure plates 284 and 286 thus form a yieldable pivot connection having an axis approximately at 300 which extends laterally of platform 28b. The dimensions and material requirements of flexure plates 284 and 286 are selected in accordance with the value of the forces to be measured to provide a deflection range of about 0.005 inch and to assure that the maximum and minimum deflecting forces to be encountered in use will fall within the elastic limits of the flexure plate material. Owing to the right angular relation of flexure plates 284 and 286, their substantial lateral dimensions, and their firm clamping connections to platform 28b and support block 290, platform 28b is constrained against lateral movement, but is free for pivotal displacement about axis 300 to the extent permitted by the elastic limits of the material of which plates 284 and 286 are made.

As shown in FIGURES 4 and 17, spring assembly 280 comprises a pair of precision, flat-sided leaf springs 302 and 304 having longitudinal flexure axes contained in a common plane which extends at right angles to the pivot axis 300 of platform 28b. Spring 304 is cantilever supported from platform 28b by a clamping plate and support block assembly 306 and extends between base 22b and platform 28b with its free end disposed adjacent to axis 300. Assembly 306 comprises a clamping plate 308, a backing plate 310, and a support block 312. Support block 312 is fixed by screws 313 (one shown in FIGURE 14) platform 28b. The left-hand end of spring 304, as viewed from FIGURE 14, is fixedly clamped between plates 308 and 310 by parallel, laterally spaced apart set screws 314 (one shown in FIGURE 14). Each screw 314 extends through vertically aligned bores formed in platform 28b, block 312, and plate 310 and is threaded into an aligning tapped bore 316 formed in plate 308 along an axis which is contained in a plane normally intersecting the platform pivot axis 300. Spring 304 is securely clamped between clamping plate 308 and backing plate 310 by tightening screws 314.

With continuing reference to FIGURE 14, spring 302 is cantilever mounted on base 22b by a clamping plate and support block assembly 318 which is of the same construction as assembly 306. Accordingly, like reference numerals suffixed by the letter *a* have been used to identify like parts.

As shown, the left-hand end of spring 302 is fixedly clamped between opposed planar surfaces of clamping plate 308a and backing plate 310a of assembly 318 by inserting screw 314a through aligning bores in base 22b, block 312a, and plate 310a and into an aligning tapped bore formed in clamping plate 308a. Support block 312a is fixed to base 22b by screws 319. Spring 302 extends from its fixed point toward the pivoted end of platform 28b and, in the position of the instrument shown in FIGURE 14, is disposed vertically below spring 304.

As shown in FIGURES 14 and 17, the corresponding free ends of springs 302 and 304 are rigidly clamped together in mutually parallel relation by a spring adjustment clamping plate assembly 322. Assembly 322 comprises a clamping plate 324 disposed between spring 304 and platform 28b, a further clamping plate 326 disposed between spring 302 and base 22b, and a spacer block 328 disposed between springs 302 and 304. A pair of machine screws 330 each extend through aligned smooth bores formed in plate 326 and block 328 on opposite sides of springs 302 and 304 and are respectively threaded into tapped through bores 331 and 332 formed in clamping plate 324. By tightening screws 330, spring 304 is rigidly clamped between clamping plates 324 and spacer block 328 and spring 302 is rigidly clamped between clamping plate 326 and spacer block 328. The clamped regions of springs 302 and 304 are parallel with each other. The axes of screws 330 are parallel and are contained in a common plane passing at right angles through the flexure axes of springs 302 and 304.

Flexing forces are serially transmitted through springs 302 and 304 in a manner similar to that described in the previous embodiments. Spring 302 is flexed at two longitudinally spaced apart regions respectively located adjacent to clamping plate assembly 322 and to assembly 318. Spring 304 also is flexed at two longitudinally spaced apart regions respectively located adjacent to assemblies 322 and 306.

The effective lengths of springs 302 and 304 are selectively adjusted by loosening screws 330, sliding assembly 322 to a selected position, and re-tightening screws 330. By shifting assembly 322 to the left from the position of parts shown in FIGURE 14, springs 302 and 304 are stiffened to increase their resistance to pivotal deflection of platform 286. Shifting assembly 322 in the opposite direction lessens the resistance of spring assembly 280.

Screw 200b, as shown in FIGURE 14, is threaded into a blind, tapped bore formed in a support block 338. Block 338 is fixed by set screws 340 (see FIGURE 15) to base 22b adjacent to the left-hand end thereof.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A force measuring instrument comprising a support base, a force receiving platform yieldably pivotally connected to said base for swinging movement about a pivot axis, and a plurality of series connected flexure spring members operatively connected to said base and said platform for resisting pivotal displacement of said platform by a force applied thereto, the unflexed longitudinal axes of said spring members and said pivot axis being contained in a substantially common plane.

2. The force measuring instrument defined in claim 1 comprising a movable output member, a multi-component motion transmitting linkage operatively connecting said platform to said output member to effect a measurable displacement of said output member in proportion to pivotal deflection of said platform, calibrating means for selectively displacing said linkage and said output member relative to said platform to adjust said output member to a null position, and further means for selectively adjusting the position of said output member relative to said platform and predetermined components of said linkage independently of said calibrating means to compensate for variations in the relative positions of said output member and said platform resulting from temperature induced expansion and contraction of the components of said multi-component motion transmitting linkage.

3. The force measuring instrument defined in claim 1 wherein the longitudinal axes of said spring members are contained in parallel planes which extend perpendicular with respect to said pivot axis.

4. The force measuring instrument defined in claim 1 comprising selectively adjustable, force transmissive means fixing said parallel ends together and providing for the adjustment of the effective lengths of said flexure members.

5. A force measuring instrument comprising a support base, a force receiving platform yieldably pivotally connected to said base, and means for yieldably resisting pivotal deflection of said platform by a force applied thereto comprising at least two flexure spring members, means securing said flexure spring members in cantilever fashion respectively to said base and said platform, and force transmissive means rigidly fixing said flexure spring members together in parallel relation at regions longitudinally spaced from the regions at which said members are respectively secured to said base and said platform to transmit flexing forces only serially through said members, the longitudinal axes of said spring members being contained in a common plane transversely intersecting the axis about which said platform is pivotable.

6. The force measuring instrument defined in claim 5 wherein said spring members and the axis about which said platform is pivotable extend between said base and said platform.

7. The force measuring instrument defined in claim 5 wherein said force transmissive means comprises means for selectively adjusting the effective lengths of said members.

8. The force measuring instrument defined in claim 7 comprising selectively actuatable means for jacking and rigidly supporting said platform in a direction to relieve said spring members of loads applied thereto.

9. The force measuring instrument defined in claim 8 wherein said selectively actuatable means comprises a rigid support surface for jacking said platform and being selectively displaceable to a position for limiting force imparted deflection of said platform.

10. The force measuring instrument defined in claim 5 wherein said each of said spring members comprises a flat-sided leaf spring.

11. The force measuring instrument defined in claim 5 comprising a movable force measurement output member and motion transmitting means operatively connecting said output member to said platform to effect a measurable displacement of said output member in proportion to pivotal deflection of said platform, said motion transmitting means comprising calibrating means for selectively adjusting the relative positions of said output member and said platform, and means for selectively adjusting the position of said output member independently of the calibration adjustment to compensate for variations between the relative positions of said output member and said platform by temperature induced expansion and contraction of said motion transmitting means.

12. A force measuring instrument comprising a support base, a platform for receiving a force to be measured, flexure plate means mounting one end of said platform on said base for bodily swinging movement about a pivot axis extending between said base and said platform, and a spring assembly for yieldably resisting swinging movement of said platform by a load applied thereto, said spring assembly comprising a first flexure spring cantilever mounted on said base, a second flexure spring cantilever mounted on said platform, the longitudinal axes of said springs being contained in a plane normally intersecting said pivot axis, and means fixing the free ends of said springs only to each other to transmit flexing forces only serially through said first and second springs, said last named means comprising clamping means for maintaining the fixed regions of said spring in parallel relation and for selectively adjusting the effective lengths of said springs.

13. A force measuring instrument comprising a support base member, a platform member for receiving a force to be measured, flexure plate means mounting one end of said platform member on said base member for bodily swinging movement about a pivot axis extending between said base member and said platform member, and means yieldably resisting swinging movement of said platform member about said axis by a force applied thereto and comprising first and second parallel spaced apart flexure springs cantilever mounted at corresponding ends one on each of said members, a further flexure spring cantilever mounted on the other of said members and extending in parallel spaced apart relation between said first and second springs, and means rigidly clamping the free ends of said first, second, and further springs in mutually parallel relation and only to each other to transmit flexing forces serially through said further spring and the assembly of said first and second springs, said pivot axis and the longitudinal axes of said first, second, and further springs being contained in a substantially common plane when said first, second, and further springs are unflexed.

14. A force measuring instrument comprising a support base, a force receiving platform yieldably pivotally connected to said base, and means for yieldably resisting pivotal deflection of said platform by a force applied thereto comprising at least two flexure spring members, means securing said flexure spring members in cantilever fashion respectively to said base and said platform, and force transmissive means rigidly fixing said flexure spring members together in parallel relation at regions longitudinally spaced from the regions at which said members are respectively secured to said base and said platform to transmit flexing forces only serially through said members, the unflexed longitudinal axes of said spring members and the axis about which said platform is pivotable being contained in a common plane.

15. A force measuring instrument comprising a support base, a force receiving platform yieldably pivotally connected to said base, and means for yieldably resisting pivotal deflection of said platform by a force applied thereto comprising at least two flexure spring members, means securing said flexure spring members in cantilever fashion respectively to said base and said platform, and force transmissive means rigidly fixing said flexure spring members together in parallel relation at regions longitudinally spaced from the regions at which said members are respectively secured to said base and said platform to transmit flexing forces only serially through said members, each of said spring members being formed with a round cross section.

References Cited
UNITED STATES PATENTS

| | | | |
|---|---|---|---|
| 2,646,274 | 7/1953 | Weckerly | 177—229 |
| 2,649,294 | 8/1953 | Walter | 177—229 |
| 2,981,100 | 4/1961 | Johnson | 73—141 |
| 3,182,495 | 5/1965 | Johnson | 73—141 |

RICHARD C. QUEISSER, *Primary Examiner.*

C. A. RUEHL, *Assistant Examiner.*

UNITED STATES PATENT OFFICE
CERTIFICATE OF CORRECTION

Patent No. 3,358,502                        December 19, 1967

Clarence Johnson

It is hereby certified that error appears in the above numbered patent requiring correction and that the said Letters Patent should read as corrected below.

Column 4, line 12, for "to", second occurrence, read -- of --; column 5, line 35, after "expansion," insert -- and --; line 51, after "extends" insert -- freely --; column 6, line 30, for "instrumens" read -- instruments --; line 31, after "spring" insert -- or --; line 42, strike out "dis-"; column 8, line 72, for "20" read -- 220 --; same line 72, for "22" read -- 222 --; column 9, line 19, strike out "the"; column 10, line 15, after "embodiments" insert a comma; line 51, for "4" read -- 14 --; line 62, after "14)" insert -- to --.

Signed and sealed this 21st day of January 1969.

(SEAL)
Attest:

Edward M. Fletcher, Jr.
Attesting Officer

EDWARD J. BRENNER
Commissioner of Patents